(12) United States Patent
Xu et al.

(10) Patent No.: US 11,277,765 B2
(45) Date of Patent: Mar. 15, 2022

(54) ADAPTIVE MEDIA SERVICE

(71) Applicant: Nokia Technologies Oy, Espoo (FI)

(72) Inventors: Xiang Xu, Nanjing (CN); Malgorzata Tomala, Wroclaw (PL); Ingo Peter, Blaustein (DE)

(73) Assignee: Nokia Technologies Oy, Espoo (FI)

( * ) Notice: Subject to any disclaimer, the term of this patent is extended or adjusted under 35 U.S.C. 154(b) by 472 days.

(21) Appl. No.: 16/330,697

(22) PCT Filed: Sep. 29, 2016

(86) PCT No.: PCT/CN2016/100895
§ 371 (c)(1),
(2) Date: Mar. 5, 2019

(87) PCT Pub. No.: WO2018/058463
PCT Pub. Date: Apr. 5, 2018

(65) Prior Publication Data
US 2021/0306898 A1 Sep. 30, 2021

(51) Int. Cl.
*H04W 28/02* (2009.01)
*H04L 43/0888* (2022.01)
(Continued)

(52) U.S. Cl.
CPC ..... *H04W 28/0268* (2013.01); *H04L 43/0888* (2013.01); *H04L 65/4069* (2013.01);
(Continued)

(58) Field of Classification Search
None
See application file for complete search history.

(56) References Cited

U.S. PATENT DOCUMENTS 9,456,451 B2 * 9/2016 Livet ................ H04W 72/087
2012/0315949 A1 * 12/2012 Zhang ................ H04W 24/08
455/525
(Continued)

FOREIGN PATENT DOCUMENTS

CN 101203018 A 6/2008
CN 101986756 A 3/2011
(Continued)

OTHER PUBLICATIONS

"3rd Generation Partnership Project; Technical Specification Group Services and System Aspects; Study on Architecture for Next Generation System (Release 14)", 3GPP TR 23.799 V1.0.0, Sep. 2016, 425 pages.
(Continued)

Primary Examiner — Andre Tacdiran
(74) Attorney, Agent, or Firm — Nokia Technologies Oy

(57) ABSTRACT

Embodiments of the present disclosure relate to methods and devices for adaptive media service. In example embodiments, a base station determines a throughput estimate associated with at least one terminal device served by the base station. The base station sends an indication of the determined throughput estimate, directly or indirectly, to one of the at least one terminal device to enable the terminal device to determine, based on the determined throughput estimate, a way for processing a media segment to be received via the base station from an application server. In this way, the media service delivery may be adapted dynamically and efficiently.

15 Claims, 2 Drawing Sheets

(51) Int. Cl.
| | |
|---|---|
| H04L 65/61 | (2022.01) |
| H04L 65/60 | (2022.01) |
| H04L 65/80 | (2022.01) |
| H04L 67/565 | (2022.01) |
| H04N 21/442 | (2011.01) |
| H04W 24/08 | (2009.01) |
| H04W 72/04 | (2009.01) |

(52) U.S. Cl.
CPC ............ *H04L 65/601* (2013.01); *H04L 65/80* (2013.01); *H04L 67/2823* (2013.01); *H04N 21/44209* (2013.01); *H04W 24/08* (2013.01); *H04W 72/04* (2013.01)

(56) References Cited

U.S. PATENT DOCUMENTS

| | | | | |
|---|---|---|---|---|
| 2014/0314024 | A1* | 10/2014 | Ohta | H04W 24/10 370/329 |
| 2014/0362776 | A1* | 12/2014 | Tian | H04W 48/20 370/329 |
| 2015/0373077 | A1* | 12/2015 | Ramamurthi | H04W 16/14 709/219 |
| 2016/0323421 | A1* | 11/2016 | Sakurai | H04L 69/163 |
| 2017/0325151 | A1* | 11/2017 | Fujishiro | H04W 48/18 |
| 2018/0139644 | A1* | 5/2018 | Nylander | H04W 4/20 |

FOREIGN PATENT DOCUMENTS

| | | |
|---|---|---|
| CN | 104284345 A | 1/2015 |
| CN | 104320794 A | 1/2015 |
| EP | 1860902 A1 | 11/2007 |

OTHER PUBLICATIONS

"Study on Context Aware Service Delivery in RAN for LTE", 3GPP TSG RAN Meeting #71, RP-160633, Agenda: 10.1.3, CMCC, Mar. 7-10, 2016, 8 pages.

"Discussion on the Solution of the DASH Optimization", 3GPP TSG-RAN3 Meeting #93, R3-161797, Agenda: 28.3, Huawei, Aug. 22-26, 2016, 3 pages.

"Throughput Prediction and Network Assisted DASH", 3GPP TSG-RAN WG3 Meeting #93, R3-161675, Agenda: 28.3, Qualcomm Incorporated, Aug. 22-26, 2016, 5 pages.

"3rd Generation Partnership Project; Evolved Universal Terrestrial Radio Access Network (E-UTRAN); Study on Context Aware Service Delivery in RAN for LTE; (Release 14)", 3GPP TR 36.933 V1.0.0, Sep. 2016, pp. 1-11.

International Search Report and Written Opinion received for corresponding Patent Cooperation Treaty Application No. PCT/CN2016/100895, dated Jun. 27, 2017, 11 pages.

\* cited by examiner

ADAPTIVE MEDIA SERVICE

RELATED APPLICATION

This application was originally filed as PCT Application No. PCT/CN2016/100895 filed Sep. 29, 2016.

TECHNICAL FIELD

Embodiments of the present disclosure generally relate to the field of telecommunications, and in particular, to a method and device for adaptive media service.

BACKGROUND

Web based streaming video applications have been increasingly popular. According to statistics, these applications are expected to consume a majority of throughput in the fourth generation (4G)/the fifth generation (5G) systems. Furthermore, they are key sources of Average Revenue Per User (ARPU) for communication operators. Most standardization efforts have been made to optimize service delivery of such applications. Both the Moving Picture Experts Group (MPEG) standards and the third generation partnership project (3GPP) standards have proposed cross-layer optimizations by means of mutual awareness of radio access network (eNB) and applications. Network assisted Dynamic Adaptive Streaming over Hyper Text Transfer Protocol (HTTP) (DASH) and video-aware scheduling has been proposed as an example technology of such mutual awareness.

In particular, for the LTE system, Context Aware Service Delivery (CASD) Study Item has been started. Optimization objectives discussed for the SI may include more efficient resource utilization, better user experiences, lower power consumption, a shorter End to End (E2E) delay, and the like. The SI also discusses potential impacts on architectures, protocols, and signaling in Evolved Universal Terrestrial Radio Access (E-UTRA) due to the enabled CASD.

SUMMARY

In general, example embodiments of the present disclosure provide a method and device for dynamic adaptive media service delivery.

In a first aspect, a method implemented in a base station is provided. According to the method, the base station determines a throughput estimate associated with at least one terminal device served by the base station based on one or more radio channel conditions. The base station sends an indication of the determined throughput estimate to one of the at least one terminal device to enable the terminal device to determine, based on the determined throughput estimate, a manner for processing a media segment to be received from an application server via the base station. A computer program product for carrying out this method is also provided.

In a second aspect, a method implemented in a terminal device is provided. According to the method, the terminal device receives an indication of a throughput estimate associated with at least one terminal device served by a base station, where the throughput estimate is determined based on one or more radio channel conditions. Based on the indication of the throughput estimate, the terminal device determines a manner for processing a media segment to be received via the base station from an application server, and then causes the media segment to be processed in the determined manner. A computer program product for carrying out this method is also provided.

In a third aspect, a base station is provided. The base station comprises a controller configured to determine a throughput estimate associated with at least one terminal device served by the base station based on one or more radio conditions; and a transceiver module configured to send an indication of the determined throughput estimate to one of the at least one terminal device to enable the terminal device to determine, based on the determined throughput estimate, a manner for processing a media segment to be received from an application server via the base station.

In a fourth aspect, a terminal device is provided. The terminal device comprises a transceiver module configured to receive an indication of a throughput estimate associated with at least one terminal device served by the base station, where the throughput estimate is determined based on one or more radio channel conditions. The terminal device further comprises a controller configured to determine, based on the indication of the throughput estimate, a manner for processing a media segment to be received via the base station from an application server, and to cause the media segment to be processed in the determined manner.

Through the following description, it would be appreciated that, according to embodiments of the present disclosure, the base station determines a throughput estimate associated with at least one terminal device served by the base station. Further, based on the throughput estimate, the terminal device determines a data rate for receiving a media segment via the base station from an application server. In this way, the media service delivery may be adapted dynamically and efficiently.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Figure 1:
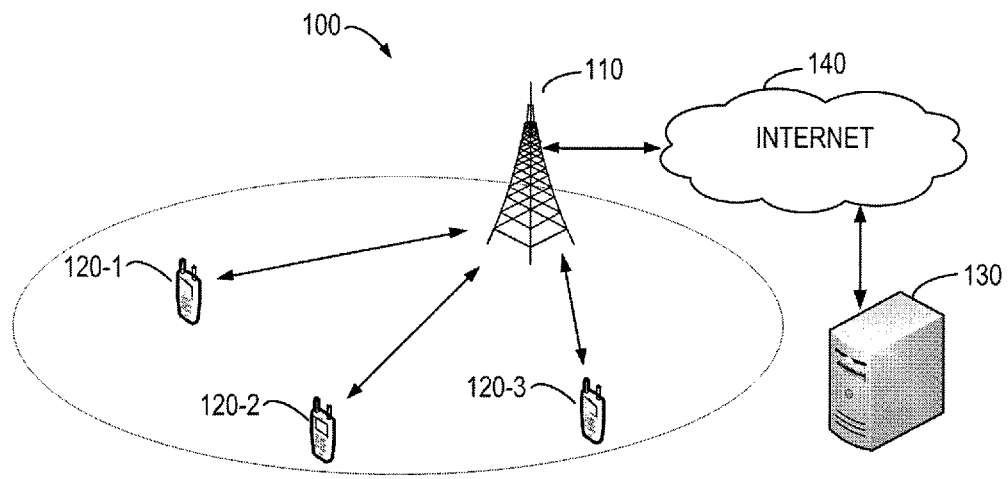
FIG. 1 shows an example environment in which embodiments of the present disclosure can be implemented.

Principle of the present disclosure will now be described with reference to some example embodiments. It is to be understood that these embodiments are described only for the purpose of illustration and helping those skilled in the art to understand and implement the present disclosure, without suggesting any limitations as to the scope of the disclosure. The disclosure described herein can be implemented in various manners other than those describe below.

As used herein, the term "terminal device," "user equipment" (UE), or "client" refers to any device capable of wireless communications. Examples of such a device include, but are not limited to, a Mobile Terminal (MT), a Subscriber Station (SS), a Portable Subscriber Station (PSS), a Mobile Station (MS), or an Access Terminal (AT). Implementations of the device include, but are not limited to, mobile phones, cellular phones, cell phones, smart phones, personal digital assistants (PDAs), portable computers, lap tops, Global Positioning System (GPS) devices, image capture devices such as digital cameras, gaming devices, music storage and playback appliances, any portable units or terminals that have wireless communication capabilities, or Internet appliances enabling wireless Internet access and browsing and the like. For the purpose of discussion, in the following, some embodiments will be described with reference to the client or UE as an example of the terminal device, and the terms "terminal device," "user equipment" (UE), and "client" may be used interchangeably in the context of the present disclosure.

As used herein, the term "base station" refers to a device which is capable of providing or hosting a cell to which one or more terminal devices can access. Examples of a base station include, but are not limited to, a Node B (NodeB or NB), a LTE Evolved NodeB (eNodeB or eNB), a 5G AN (Access Network), a Remote Radio Unit (RRU), a radio header (RH), a remote radio head (RRH), a relay, a low power node such as a femto, a pico, and the like.

As used herein, the term "application server" refers to a server that is capable of providing an application to the client. The application may be implemented in any suitable type, including, but not limited to, a media-type application.

As used herein, the term "media" refers to a type of carried out service, destined for the client. Examples of media include, but are not limited to, audios, videos, movies, and the like. Accordingly, the term "media segment" refers to a segment of an audio, a video, a movie, and the like.

As used herein, the term "throughput" refers to amount of data transmitted in a unit time interval within a network. In the context of the present disclosure, the downlink (DL) throughput refers to amount of data transmitted in DL, for example, from the base station to the terminal device, in the unit time interval. As used herein, the phrase "throughput estimate" refers to the throughput value or function (for example, a ratio). For example, when compared to the recently used throughput, the throughput estimate may stand for a throughput adjustment including a throughput reduction or increase.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As described above, most standardization efforts have been made to optimize the service delivery of the Web based streaming video applications. A fundamental optimization principle is that a DASH client, i.e. the UE, requests a video segment with appropriate video quality from an application server based on DL throughput prediction. Conventionally, DL throughput is predicted by the DASH client based on previous downloads without considering radio resources.

However, the radio resources are continuously changing for example due to changes in loads of the base station. The changes of the radio resources may degrade accuracy of the prediction. In the case that the DL throughput is inaccurately predicted, if the client conservatively requests the application server for a low data rate to watch the video, the video quality will be low. If the client aggressively requests for a high data rate, more video stalling will occur. Accordingly, end user experiences will be significantly degraded.

As a result, there is a need for improving the prediction accuracy of the DL throughput by considering the radio resources. One conventional method is that the terminal device requests the base station to predict available DL throughput. For example, when the terminal device needs to determine a data rate for receiving a video segment for the application server, the terminal device may send a request to an access network entity for an enabled throughput range. The base station then predicts the DL throughput and returns the predicted throughput to the UE. However, this method requires the terminal device to frequently query the base station, which may result in large system overhead. In addition, there are generally a great number of UEs within the coverage of the base station, and the base station may need to predict the throughput for each of the UEs. These predictions may significantly aggravate the loads at the base station.

Another conventional method for optimizing the prediction accuracy of the throughput is that the terminal device predicts the DL throughput with base station assistance. For example, the base station may share with the terminal device its cell level information, such as resource status, Quality of Service (QoS) Class Identifier (QCI) level distributions, throughput, and the like. Further, the terminal device predicts available throughout according to the whole cell information. However, in accordance with the cell information obtained from the base station, the terminal device is unaware of the amount of resources that is to be scheduled to itself. As a result, the prediction of the available throughput at the terminal device is also not accurate.

In order to at least in part solve the above and other potential problems, embodiments of the present disclosure allows the base station to determine a throughput estimate associated with at least one terminal device served by the base station. Then, the base station sends an indication of the determined throughput to one of the at least one terminal device. In this way, after receiving the indication of the throughput, the terminal device can determine, based on the throughput value, required throughput prediction adjustment (e.g. throughput reduction or throughput increase) used for a data rate for receiving a media segment via the base station from an application server.

Principles and implementations of the present disclosure will be described in detail below with reference to FIGS. 1 and 2. In the following descriptions, some embodiments will be discussed by taking a video delivery as an example. It is to be understood that this is only for the purpose of illustration to assist readers in better understanding of concepts of the embodiments of the present disclosure, without suggesting any limitations.

Reference is first made to FIG. 1 which shows an example environment 100 in which embodiments of the present disclosure can be implemented. The environment 100 includes a base station 110 and three terminal devices 120-1, 120-2, and 120-3 (collectively referred to as "terminal devices" 120). The terminal devices 120 are within the coverage of the base station 110 and served by the base station 110. These terminal devices 120 may communicate with the base station 110 and communicate via the base station 110 with each other over a wireless communication network (not shown).

The communications over the wireless communication network may conform to any suitable wireless standard including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As shown, the environment 100 also comprises an application server 130. The base station 110 exchanges data with the application server 130, for example, via the Internet 140. The communications between the base station 110 and the application server 130 may conform to any suitable packet transport standard including, but not limited to, Transmission Control Protocol (TCP)/Internet Protocol (IP), User Datagram Protocol (UDP), and the like. Further, the terminal devices 120 communicate with the application server 130 via the base station 110. For example, the terminal devices 120 may download data, such as, audios, videos, movies, and the like, from the application server 130. Furthermore, the communications between wireless communication network and application server may be performed via interfaces and referenced points conforming to PCRF (Policy and Charging Rules Function).

It is to be understood that the numbers of the base stations, the terminal devices, and the application servers are only for the purpose of illustration without suggesting any limitations. The environment 100 may include any suitable number of base stations, terminal devices, and application servers adapted for implementing embodiments of the present disclosure.

According to embodiments of the present disclosure, the base station 110 determines a throughput estimate for the terminal devices 120 served by itself. If the terminal device 120-1 is to receive a media segment from the application server 130, the terminal device 120-1 uses the throughput determined by the base station 110 to determine a data rate for receiving the media segment. In this way, the data rate may be determined considering the radio resources, and therefore the accuracy and efficiency of determination of the data rate may be improved.

Detailed operations and processes of the terminal device 120-1, the base station 110, and the application server 130 will be described below with reference to FIG. 2 which shows an example communication and processing procedure 200 among these elements according to some embodiments of the present disclosure. It is to be understood that a few acts/steps in the procedure 200 may not be necessary. In some other embodiments, these acts/steps may be omitted, as will be described below in detail. For the purpose of discussion, the procedure 200 will be described with reference to FIG. 1.

As shown, at 205, the base station 110 determines a throughput estimate associated with at least one terminal device, such as the terminal devices 120 as shown in FIG. 1, which is served by the base station 110. As described above, the throughput estimate may indicate an actual throughput value such as 100 kbps, or a throughput function such as a ratio compared with the previous throughput such as 10%. The throughput estimate can be determined based on at least one radio condition, for example. Examples of such radio conditions includes, but are not limited to, traffic loads, dynamic resource allocation, channel condition, the number of served terminal devices, available bandwidths, the information provided by the terminal device, such as size and playback duration, and the like.

The base station 110 may determine the throughput estimate according to any suitable rule. In some embodiments, the base station 110 may determine a single throughput estimate value for all of the terminal devices 120. For example, the base station 110 may determine one throughput estimate for all of the bearers, for example, including Guaranteed Bit Rate (GBR)/non-GBR bearers, associated with the served terminal devices 120. The single throughput estimate may indicate all of the terminal devices 120 to reduce/increase the respective throughput by the same reduction/increase degree.

In some embodiments, the QoS class and/or application type(s) may be taken into consideration. For example, it is possible to determine an achievable throughput for a given QoS class or a certain type of application associated with the terminal device. Then the throughput value or function representing an increase or decrease of the available throughput can be determined.

For example, if the terminal device 120-1 is assigned to a higher QoS class than the terminal devices 120-2 and 120-3, the base station 110 may determine a lower throughput reduction/increase for the terminal device 120-1 compared to the terminal devices 120-2 and 120-3. Alternatively, or in addition, the QoS class may be associated with an individual bearer. For example, each of the GBR/non-GBR bearers may be associated with a specific QoS Class Identifier (QCI). Accordingly, the base station 110 may determine a lower throughput reduction (or higher throughput increase) for a bear having a higher QCI or an operator preferred QCI, and vice versa. In this way, the quality of the bear having a higher QoS class may be guaranteed.

As another example, a service provider of the application server 130 may have an agreement with the operator of the base station 110. In this case, the base station 110 may determine a lower throughput reduction (or a higher throughput increase) for the application data provided by the application server 130.

According to embodiments of the present disclosure, the throughput estimate may be represented in any suitable form. In some embodiments, the estimate may be represented as an indicator of reduction/increase ratio that indicates a reduction/increase degree of the throughput at the terminal devices 120. Other representations of the throughput estimate are also possible. For example, the estimate may be represented as amount of the throughput, or amount of reduction/increase, or as increase/reduction from the previously applicable throughput value.

After the base station 110 determines (205) the throughput estimate for the terminal devices 120, the base station 110 sends (210), directly or indirectly, an indication of the determined throughput or throughput change ratio to one of the at least one terminal device, such as the terminal device 120-1 as shown in FIG. 1. Based on the throughput estimate, the terminal device 120-1 can determine a manner for processing the one or more media segments to be received via the base station 110 from the application server 130. The detailed operations of the terminal device 120-1 will be described in the following paragraphs.

The indication can be sent to the terminal device 120-1 may be implemented in any suitable method and in any suitable timing. In some embodiments, the base station 110 may send the indication of the throughput estimate to the terminal device 120-1 in broadcast signaling periodically. The broadcast signaling may be new broadcast signaling that is designed dedicatedly for sending the indication. In some other embodiments, the indication may be sent periodically by the base station 110 in a dedicated signaling which may likewise be dedicatedly designed. It is to be understood that other sending timing/method is possible. For example, the indication may be sent by the base station 110 in response to an event trigger, for example, when the UE's radio bearer is established, or when the initial DL data is sent to the terminal device, or when the base station's load is changed above/below a threshold.

In order to minimize a change in air architectures between the terminal devices 120 and the base station 110, in some embodiments, the indication may be sent by reusing existing information. For example, the indication may be contained in data that is transmitted via the base station 110 to a core network (not shown), which is then sent to the terminal device 120-1. The core network may contain the Policy Control and Charging Function (PCCF), Serving GateWay (S-GW), PDN GateWay (P-GW), Mobility Management Entity (MME), and the like. In this example, the base station 110 may report the determined throughput estimate to a network element in the core network, such as a Policy Control and Charging Function (PCCF). As an example, the indication may be implemented as part of DL General Packet Radio Service (GPRS) Tunnel Protocol User Plane (GTP-U) header. Alternatively, the base station 110 may report the determined throughput estimate or throughput reduction/increase ratio to another network element in the core network, such as a Mobility Management Entity (MME). The core network may then contain the indication of the throughput estimate or throughput reduction/increase ratio into the Non-Access Stratum (NAS) messages and send the NAS message to the base station 110, which in turn forwards the NAS message to the terminal device 120-1.

It is to be understood that other network elements in the core network may also be involved in the sending of the indication. It is also to be understood that any other information element in a HTTP streaming path between the core network and the base station may be used. That is, the indication of the throughput estimated can be sent indirectly from the base station 110 to the terminal device 120-1.

Upon receipt (210) of the indication of the throughput estimate, the terminal device 120-1 determines (215), based on the throughput estimate, a manner for receiving a media segment(s) to be received via the base station 110 from the application server 130. For example, the terminal device 120-1 may determine a data rate for requesting the media segment. As an example, in the embodiments where the throughput estimate is represented as a reduction ratio, such as 60%, the terminal device 120-1 may determine that the data rate will be reduced to be 60% of the data rate of history downloads, or the data rate agreed during the radio bearer establishment procedure.

In some embodiments, the data rate may be determined by selecting from among available data rates that are enabled by the application server 130. For example, the application server 130 may broadcast available data rates of the video segment for selection by the terminal devices. Accordingly, after the terminal device 120-1 obtains the throughput estimate from the base station 110, the terminal device 120-1 may first determine a maximum data rate that is enabled by the reduced/increased throughput. Then, the terminal device 120-1 may select, from the available data rates, a data rate based on the maximum data rate.

After the data rate is determined (215), the terminal device 120-1 sends (220), via the base station 110 to the application server 130, a request for the media segment which indicates the selected video segment or quality, the determined data rate, or the like. The request may be implemented in any suitable message. For example, the terminal device 120-1 may send a HTTP GET message as the request to the application server 130.

The determination of the data rate and the sending of the request may be implemented by the terminal device 120-1 in any suitable timing. In some embodiments, the terminal device 120-1 may determine the data rate and send the request indicating the data rate after a Packet Data Unit (PDU) session is established with the application server 130. In some other embodiments, the terminal device 120-1 may receive an indication of the throughput estimate/reduction/increase from the base station 110 during the playback of a video from the application server 130. In response to the throughput value, the terminal device 120-1 may determine an updated data rate and request the application server 130 for the media segment with the updated data rate.

As shown, in response to the request from the terminal device 120-1, the application server 130 transmits (225) the DL data of the media segment to the base station 110. Then, the base station 110 forwards (at 230) the DL data to the terminal device 120-1 at the requested data rate. It is to be understood that depending on the operating state and/or other factors, the base station 110 may make some adjustments to the requested data rate. For example, if the base station 110 is under a relatively heavy load, the base station 110 may send the media segment with a data rate a little bit lower than the requested one. Other adjustments are possible as well.

In order to further improve the accuracy of the throughput estimate determined by the base station 110, in some embodiments, after the terminal device 120-1 determines the data rate at 215, the terminal device 120-1 may report (235) the following information to the base station: a size, playback duration, and/or required data rate of the media segment. Accordingly, the base station 110 may determine amount of resources to be used by the terminal device 120-1 during playback of the media segment and further update the determined throughput indication.

Figure 2:
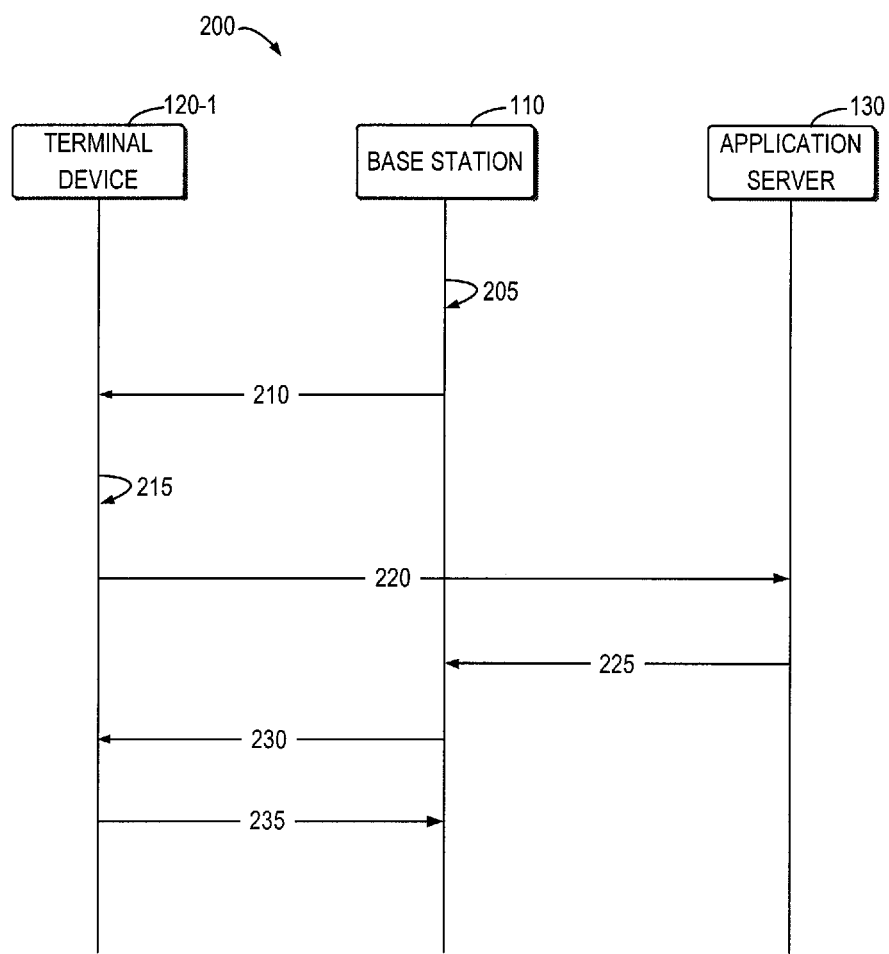
FIG. 2 shows an example communication and processing procedure in accordance with some embodiments of the present disclosure.

It is to be understood that the reporting of the determined data rate by the terminal device 120-1 may not be performed in the order noted in FIG. 2. For example, it is also possible that the determined data rate, size, playback duration and the like are reported by the terminal device 120-1 to the base station 110 before the terminal device 120-1 send the request to the application server 130.

The determined throughput estimate may be updated by the base station 110 based on any other suitable information. In some embodiments, the update of the determined throughput indication may be based on data transmitted from the application server 130. For example, the base station 110 may receive the media segment from the application server 130 and forward the media segment to the terminal device 120-1 at the determined data rate. In this example, the base station 110 may determine, from the received media segment, the amount of resources to be used by the terminal device 120-1 during playback of the media segment and further update the determined throughput indication based on the amount of resources.

According to embodiments of the present disclosure, the terminal device provided with, for example, the HTTP streaming, may receive an input related to radio resources from the base station. Accordingly, adaptive control and tailoring of the application service may be allowed.

Figure 3:
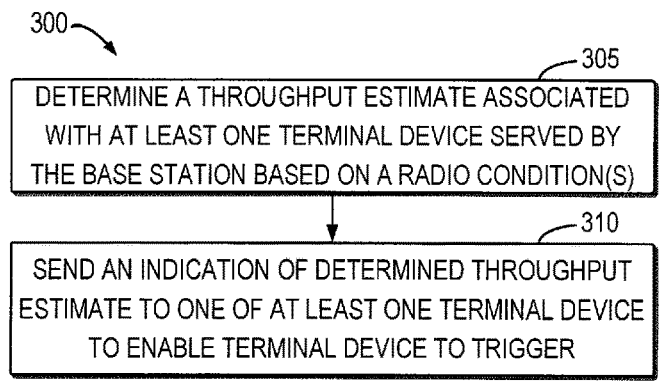
FIG. 3 is a flowchart of an example method implemented in a base station in accordance with some embodiments of the present disclosure.

FIG. 3 shows a flowchart of an example method 300 in accordance with some other embodiments of the present disclosure. The method 300 can be implemented at the base station 110 as shown in FIG. 1. For the purpose of discussion, the method 300 will be described with reference to FIG. 1.

At block 305, the base station 110 determines a throughput estimate associated with at least one terminal device served by the base station 110, based on one or more radio conditions. The throughput estimate indicates a throughput value or a throughput function. At block 310, the base station 110 sends an indication of the determined destined throughput value to one of the at least one terminal device, such that the terminal device 120-1 can determine, based on the determined throughput, a manner for processing a media segment to be received via the base station 110 from the application server 130.

In some embodiments, the base station 110 may determine an achievable throughput for a quality of service (QoS) level class or a type of application associated with the at least one terminal device, and determining the throughput value or the throughput function representing an increase or decrease of the available throughput.

In some embodiments, the base station 110 may send the indication of the determined throughput value to the terminal device 120-1 in broadcast or dedicated signaling.

In some embodiments, the base station 110 may report the determined throughput estimate to a core network. Then, the base station 110 may receive from the core network a Non-Access Stratum (NAS) message containing the indication of the determined throughput estimate. Further, the base station 110 may forward the NAS message to the terminal device 120-1.

In some embodiments, the base station 110 may receive, from the terminal device 120-1, information including at least one of a size, playback duration, and required data rate of the media segment. The base station 110 may then determine, based on the received information, amount of resources to be used by the terminal device during playback of the media segment.

In some embodiments, the base station 110 may receive, from the application server 130, the media segment. Then, the base station 110 may determine amount of resources to be used by the terminal device 120-1 during playback of the media segment, and further forward, to the terminal device, the media segment at the determined data rate.

In some embodiments, the base station 110 may update the determined throughput reduction/increase based on the determined amount of resources.

Figure 4:
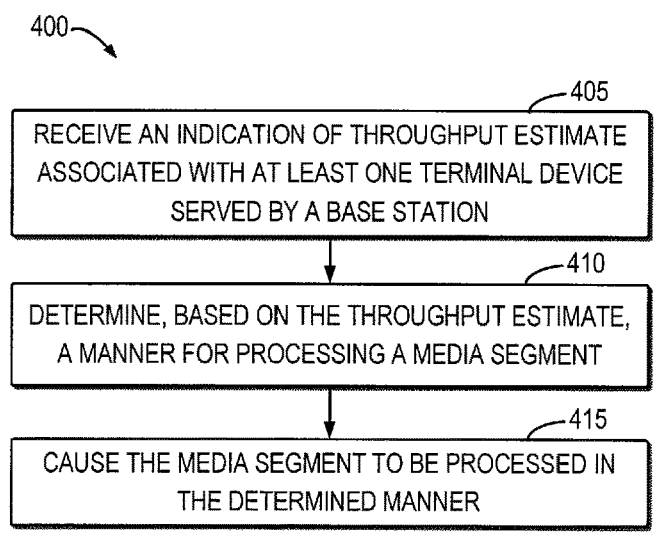
FIG. 4 is a flowchart of an example method implemented in a terminal device in accordance with some embodiments of the present disclosure.

FIG. 4 shows a flowchart of an example method 300 in accordance with some other embodiments of the present disclosure. The method 400 can be implemented at the terminal device 120-1 as shown in FIG. 1. For the purpose of discussion, the method 400 will be described with reference to FIG. 1.

At block 405, the terminal device 120-1 receives an indication of a throughput estimate associated with at least one terminal device served by the base station 110, where the throughput estimate is determined based on one or more radio channel conditions. At block 410, the terminal device 120-1 determines, based on the throughput value, a manner for processing a media segment to be received via the base station 110 from the application server 130. For example, a desired data rate may be determined. At block 415, the terminal device 120-1 causes the media segment to be processed in the determined manner. For example, the terminal device 120-1 may send a request for the media segment where the request indicates the desired data rate.

In some embodiments, the terminal device 120-1 may receive, from the base station 110, the indication of the throughput estimate for a quality of service (QoS) class or a type of application associated with the at least one terminal device.

In some embodiments, the terminal device 120-1 may receive, from the base station 110, the indication of the throughput estimate in broadcast or dedicated signaling. In some other embodiments, the terminal device 120-1 may receive, from the base station 110, data NAS message containing the indication of the throughput estimate and being originated from a core network.

In some embodiments, the terminal device 120-1 may report, to the base station 110, information including at least one of a size, playback duration, and required data rate of the media segment to enable the base station 110 to determine amount of resources to be used by the terminal device 120-1 during playback of the media segment.

It is to be understood that all operations and features related to the base station 110 and the terminal device 120-1 described above with reference to FIGS. 1 and 2 are likewise applicable to the methods 300 and 400 respectively and have similar effects. For the purpose of simplification, the details will be omitted.

Figure 5:
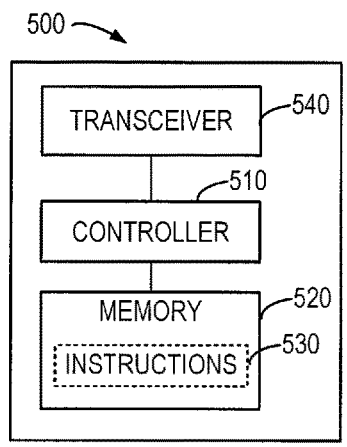
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as an example implementation of the base station 110 or the terminal device 120-1 as shown in FIG. 1. Accordingly, the device 500 can be implemented at or as at least a part of the base station 110 or the terminal device 120-1, respectively.

As shown, the device 500 includes a controller 510, a memory 520 coupled to the controller 510, and a transceiver module 540 coupled to the controller 510. The transceiver module 540 may include one or more transceivers, including wireless and/or wired transceivers. The memory 520 stores instructions 530. The controller 510 controls the operations and functions of the device 500. For example, the controller 510 may implement various operations by means of the instructions 530 stored in the memory 520. For example, the instructions 530 are assumed to include program that, when executed by the associated controller 510, enable the device 500 to operate in accordance with the embodiments of the present disclosure, as discussed herein with reference to FIGS. 1 to 4.

The memory 510 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 510 is shown in the device 500, there may be several physically distinct memory modules in the device 500. The controller 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple controllers, such as an application specific integrated circuit chip that is slaved in time to a clock which synchronizes the main processor.

When the device 500 acts as the base station 110, the transceiver module 540 may communicate with the terminal devices and core network. In this case, the transceiver module 540 may operate with the controller 510 to implement the method 300 as described with reference to FIG. 3. When the device 500 acts as the terminal device 120-1, the transceiver module 540 may operate with the controller 510 to implement the method 400 as described with reference to FIG. 4. All of the features described above with reference to FIGS. 1 to 4 are all applicable to the device 500, and the details thereof will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
receiving, by a terminal device and from a base station, an indication of a throughput estimate associated with the terminal device served by the base station, the throughput estimate being determined based on one or more radio channel conditions and the indication being received in a Non-Access Stratum (NAS) message and originated from a core network;
determining, based on the indication of the throughput estimate, a manner for processing a media segment to be received via the base station from an application server; and
causing the media segment to be processed in the determined manner.

2. The method of claim 1, wherein determining the manner comprises determining a data rate, and processing the media segment comprises sending, via the base station to the application server, a request for the media segment that indicates the determined data rate.

3. The method of claim 1, wherein receiving the indication comprises:
receiving, from the base station, the indication of the throughput estimate for a quality of service (QoS) class or a type of application associated with terminal device.

4. The method of claim 1, wherein receiving the indication comprises:
receiving, from the base station, the indication of the throughput estimate in broadcast or dedicated signaling.

5. The method of claim 1, further comprising:
reporting, to the base station in response to the processing, information including at least one of a size, playback duration, and required data rate of the media segment.

6. A terminal device, comprising:
a transceiver module configured to receive, from a base station, an indication of a throughput estimate associated with the terminal device served by the base station, the throughput estimate being determined based on one or more radio channel conditions and the indication being received in a Non-Access Stratum (NAS) message and originated from a core network; and
a controller configured to:
  determine, based on the indication of the throughput estimate, a manner for processing a media segment to be received via the base station from an application server; and
  cause the media segment to be processed in the determined manner.

7. The terminal device of claim 6, wherein the controller is configured to determine a data rate, and the transceiver module is configured to send, via the base station to the application server, a request for the media segment that indicates the determined data rate.

8. The terminal device of claim 6, wherein the transceiver module is configured to:
  receive, from the base station, the indication of the throughput estimate for a quality of service (QoS) class or a type of application associated with the terminal device.

9. The terminal device of claim 6, wherein the transceiver module is configured to:
  receive, from the base station, the indication of the throughput estimate in broadcast or dedicated signaling.

10. The terminal device of claim 6, the transceiver module is configured to:
  report, to the base station and in response to the processing, information including at least one of a size, playback duration, and required data rate of the media segment.

11. A base station, comprising:
a controller configured to determine a throughput estimate associated with a terminal device served by the base station based on one or more radio channel conditions, the throughput estimate indicating a throughput value or a throughput function; and
a transceiver module configured to:
  report the determined throughput estimate to a core network;
  receive, from the core network, a Non-Access Stratum (NAS) message containing an indication of the determined throughput estimate; and
  forward the NAS message to the terminal device to enable the terminal device to determine, based on the determined throughput estimate, a manner for processing a media segment to be received from an application server via the base station.

12. The base station of claim 11, wherein the controller is configured to:
  determine an achievable throughput for a quality of service (QoS) class or a type of application associated with the terminal device; and
  determine the throughput value or the throughput function based on the determined achievable throughput.

13. The base station of claim 11, wherein the transceiver module is configured to:
  send the indication of the determined throughput estimate to the terminal device in broadcast or dedicated signaling.

14. The base station of claim 11, wherein the transceiver module is configured to receive, from the terminal device, information including at least one of a size, playback duration, and required data rate of the media segment.

15. The base station of claim 11, wherein the transceiver module is configured to receive, from an application server, the media segment and to forward, to the terminal device, the media segment.

* * * * *